US012128538B2

(12) United States Patent
Jampolski et al.

(10) Patent No.: US 12,128,538 B2
(45) Date of Patent: Oct. 29, 2024

(54) LOCKING DEVICE FOR A HANDHELD POWER TOOL

(71) Applicant: Robert Bosch GmbH, Stuttgart (DE)

(72) Inventors: Leon Jampolski, Waiblingen (DE); Eugenia Schink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/518,241

(22) Filed: Nov. 3, 2021

(65) Prior Publication Data

US 2022/0143801 A1 May 12, 2022

(30) Foreign Application Priority Data

Nov. 9, 2020 (DE) ..................... 10 2020 214 011.1

(51) Int. Cl.
*B25F 5/00* (2006.01)
*B25F 3/00* (2006.01)

(52) U.S. Cl.
CPC ................ *B25F 5/001* (2013.01); *B25F 3/00* (2013.01)

(58) Field of Classification Search
CPC ........................................................ B25F 3/00
See application file for complete search history.

(56) References Cited

U.S. PATENT DOCUMENTS 5,697,158 A * 12/1997 Klinzing ............ B23D 57/0076 30/340
2019/0291247 A1* 9/2019 Gordon ................. B23B 45/003
2021/0220925 A1* 7/2021 Knight ................ F21V 33/0084

FOREIGN PATENT DOCUMENTS

DE 93 02 807 U1 7/1993
EP 2 869 976 B1 2/2017

* cited by examiner

*Primary Examiner* — Daniel Jeremy Leeds
(74) *Attorney, Agent, or Firm* — Maginot, Moore & Beck LLP

(57) ABSTRACT

The disclosure relates to a locking device for an in particular rotary-drive handheld power tool, in particular a rotary power tool, with a shaft for driving an accessory device which can be connected to the handheld power tool, with a locking element for locking the shaft, and with an activating element for activating the locking device. The activating element is mounted so that it can move in an axial direction along the shaft, in particular a shaft axis of the shaft.

16 Claims, 2 Drawing Sheets

LOCKING DEVICE FOR A HANDHELD POWER TOOL

This application claims priority under 35 U.S.C. § 119 to patent application no. DE 10 2020 214 011.1, filed on Sep. 29, 2020 in Germany, the disclosure of which is incorporated herein by reference in its entirety.

The disclosure relates to a locking device.

BACKGROUND

A spindle locking device for a portable power tool is disclosed in EP 2 869 976 B1 which comprises a movably mounted locking element for locking a spindle in one direction and which comprises an operating element for activating the locking element.

SUMMARY

The object of the disclosure is to improve a locking device for a handheld power tool using simple structural measures.

The object is achieved by a locking device for an in particular rotary-drive handheld power tool with a shaft for driving an accessory device which can be connected to the handheld power tool, with a locking element for locking the shaft, and with an activating element for activating the locking device.

It is proposed that the activating element is mounted so that it can move in an axial direction along the shaft, in particular a shaft axis of the shaft.

The present locking device is colloquially referred to as a "spindle lock" and is provided to lock a shaft or a spindle in order to be able to swap an accessory device. The spindle is here usually retained positively in order to secure the shaft against twisting and, for example, to connect the accessory device to the shaft indirectly or directly. It can hereby be prevented by means of the locking device that the shaft twists when the accessory device is connected to the handheld power tool or the shaft.

A multi-function power tool can hereby preferably be considered as the handheld power tool which can be connected to a plurality of accessory devices or attachments and provide various functions. A multi-function rotary power tool can preferably be considered as the handheld power tool. By virtue of a plurality of different accessory devices, there are multiple possible applications such as cutting, grinding, milling, polishing, and drilling. The handheld power tool can preferably be provided for operation using one hand.

The handheld power tool can be operated by means of a battery unit. The handheld power tool can have an in particular rechargeable battery unit. The battery unit can be provided to supply the handheld power tool with electrical energy. The battery unit is provided to store electrical energy, in particular temporarily. The battery unit can have one or more battery cells. The battery unit can take the form of a battery pack.

Alternatively or additionally, the handheld power tool can be operated by means of a cable, for example joined to a power plug.

The handheld power tool can have a motor housing. The motor housing can have a handle region which is provided for gripping the handheld power tool and holding it with one hand.

The shaft can be designed as a driving shaft. The shaft can be designed as a driven shaft. The battery unit can be arranged in the handle housing. The battery unit can be enclosed at least partially by the handle housing. The battery unit can be arranged on or in the handle housing in such a way that removal of the battery unit by disassembling the motor housing is provided. The battery unit is preferably arranged fixedly or non-removably in the motor housing. Alternatively, the battery unit can be connected detachably to the motor housing. In particular, the handheld power tool, in particular the motor housing, can have a battery interface which can be accessed from outside or without disassembling the motor housing in order to couple and in particular electrically connect the battery unit to the battery interface.

The battery unit can extend along an axis which coincides with a longitudinal axis of the motor housing or the handle housing. The battery unit can extend along an axis which coincides with a longitudinal axis of the shaft or a drive unit of the handheld power tool or is arranged at least parallel thereto.

The locking element can be provided to lock the shaft indirectly or directly. The locking element can have a substantially elongated form. The locking element can extend transversely to the shaft. The locking element can be provided to be connected positively to the shaft, in particular to limit or prevent movement of the shaft. The locking element can be provided to engage at least partially in the shaft. The locking element can be designed as a locking pin. The locking element can be designed as a locking bolt.

The locking element can block the shaft and hence the rotational movement of the shaft by activating the locking element such that it is possible to replace a tool on the handheld power tool (locking state).

The activating element can be provided to activate the locking device, in particular the locking element. The activating element can take the form of a switch. The activating element can be mounted so that it can move in the axial direction with respect to the shaft, in particular with respect to the shaft axis of the shaft. The activating element and the locking element can be mounted so that they can move in different directions of movement. For example, the locking element can be mounted so that it can move in a direction of movement which is mounted transversely, in particular perpendicular, to a direction of movement of the activating element.

As a result, a locking device can be provided which has a particularly compact design and in addition enables particularly simple and intuitive operation. Moreover, accidental confusion of the locking device with the on/off switch can be prevented by the activating element being activated in a different way than the on/off switch as the activating element is activated in an axial direction along the shaft axis, whereas the on/off switch is activated in a radial direction with respect to the shaft axis. The locking device can be arranged very flexibly on the handheld power tool by virtue of the compact design.

It is proposed that the activating element is mounted so that it can move in an axial direction along the shaft, in particular a shaft axis of the shaft.

The dependent claims provide further expedient developments of the locking device according to the disclosure.

It can be expedient that the activating element is mounted so that it can move in translation. It can moreover be expedient that the activating element is mounted so that it can move parallel to the shaft, in particular to the shaft axis of the shaft. As a result, a particularly compact locking device can be provided which can be operated particularly securely and comfortably.

It can furthermore be expedient that the locking device has a locking state and a release state, wherein the activating element is arranged closer to the accessory device in the locking state than in the release state.

It can furthermore be expedient that, when it moves toward the accessory device, the activating element can be shifted into a release state and, when it moves away from the accessory device, can be shifted into a locking state. The activating element is arranged at an end of the handheld power tool, in particular of the motor housing, which is remote from the accessory device.

In particular when the handheld power tool is in operation, an operator can, for example, in a similar way to holding a pen, apply a pressing force to the activating element in the direction of the accessory device by means of the index finger and thumb. This pressing force acts on the activating element as long as a finger of the operator is arranged on the activating element and the activating element is mounted so that it can move toward the accessory device in order to activate the activating element. In order to prevent the locking state being accidentally activated during the operation of the handheld power tool, the locking state can be set by movement in a direction away from the accessory device. Accordingly, the locking device can be designed in such a way that, when it moves away from the accessory device, the activating element can be moved from a release state into a locking state and, when it moves toward the accessory device, can be moved from a locking state into a release state.

It can consequently be ensured that the activating element is not accidentally activated during the operation of the handheld power tool by a pressing force from the operator acting on the activating element and shifting the latter into the locking state.

It is proposed that the locking device has an actuating element which is provided, depending on a movement of the actuating element, to move the locking element in a different movement direction than the activating element. The actuating element can be designed integrally with the activating element. The actuating element can be provided to move the locking element transversely, in particular perpendicular, to the movement direction of the activating element. The actuating element can be arranged on the activating element. The actuating element can contact the locking element in a locking state. The actuating element can be arranged at a distance from and not contacting the locking element in a release state. The actuating element can be designed as an actuating protrusion. The actuating element can extend in a radial direction with respect to the shaft. The actuating element can have a slope. The slope can be arranged between a locking position (in particular a locking state) and a release position (in particular a release state). The actuating element can form a slope which is provided to move the locking element from a release state into a locking state. As a result, a movement of the activating element along the shaft or the shaft axis into a movement of the locking element in a radial direction can be enabled in a particularly simple and compact fashion.

It is moreover proposed that the locking device has a spring element which is provided to reset the locking device, in particular the activating element and/or the locking element. The spring element can be designed as a tension and/or compression spring element. The spring element can be designed as a helical spring. The spring element can be provided to absorb kinetic energy when the activating element and/or the locking element is/are moved from the release state into the locking state. The spring element can be provided to deliver kinetic energy when the activating element and/or the locking element is/are moved from the locking state into the release state. The locking state can be reset particularly simply as a result.

It is furthermore proposed that the locking device has an activating lever which is provided to restrict movement of the activating element. The activating lever can be arranged on a side of the activating element remote from the actuating element. The actuating lever can extend in a radial direction with respect to the shaft. The activating lever can be provided such that it is guided in a recess of the handheld power tool, in particular of the motor housing of the handheld power tool. The activating lever can protrude relative to the motor housing, in particular in a radial direction. The activating lever can be designed integrally with the activating element. The activating lever can be arranged on or bear against a first end of the recess in a release state. The activating lever can be arranged on or bear against a second end of the recess in a locking state. The first end of the recess is arranged closer to the accessory device than the second end of the recess. The activating lever can form a holding shoulder which serves as a gripping region when working with the handheld power tool without shifting the locking device into the locking state.

It can moreover be expedient that the locking device has a locking sleeve which is arranged on the shaft. The locking sleeve can be connected non-rotatably to the shaft. The locking sleeve can delimit a radial extent of the shaft. The locking sleeve can completely surround or encase the shaft in a circumferential direction. The locking sleeve can be provided to connect the shaft non-rotatably and positively to the locking element.

It can furthermore be expedient that the locking sleeve has a locking recess which is provided to receive the locking element in a locking state and to secure the shaft against twisting. It should be understood that the locking sleeve can have a single locking recess or a plurality of locking recesses. The locking recess is delimited by the locking sleeve. The locking recess is delimited in a radial direction by the shaft.

A notch effect on the shaft can be prevented by a locking sleeve of this type, as a result of which the shaft can have a smaller design.

The disclosure moreover relates to a handheld power tool with a locking device and with a drive unit which is provided to drive the accessory device directly. “Drive directly” should be understood in particular to mean that no transmission device, which is preferably provided to transmit a movement of the drive motor directly to the accessory device, is provided between the drive unit and the accessory device. A drive unit can in particular be understood to mean an electric motor. The drive unit can be commutated electronically (EC drive) or mechanically (brushed drive). The drive unit can be provided to drive the shaft, which in turn drives the accessory tool. A particularly simple and effective transmission of force from the drive unit to the accessory device can be enabled as a result. It should be understood that other types of drive units which would be viewed as appropriate by a person skilled in the art can also be considered.

The handheld power tool can have an on/off switch element, in particular in the form of a button, which is arranged adjacent, in particular directly adjacent, to the activating element. The on/off switch element can be provided to switch the drive unit on and off. The on/off switch can be mounted so that it can move in a radial direction with respect to the shaft in order to switch the drive unit on and off. The on/off switch can be arranged on a side of the activating element remote from the accessory device.

Because the on/off switch element of the drive unit is arranged adjacent to the activating element of the locking device, it can happen that the operator of the handheld power tool accidentally activates the activating element for activating the locking device, instead of the on/off switch element for switching the drive unit on/off, as a result of which rotational movement of the shaft is impeded or blocked altogether. This can cause the functioning of the handheld power tool and in particular the locking device to be adversely affected.

The risk of confusion can be prevented by the activating element and the on/off switch element requiring activation in different directions in order to activate the respective functions (locking or switching on/off). For example, the activating element can be mounted so that it can move in an axial direction along the shaft, in particular a shaft axis of the shaft, in order to move the locking device into an interlocking state, and the on/off switch element can be mounted so that it can move in a radial direction relative to the shaft, in order to switch the drive unit on/off.

BRIEF DESCRIPTION OF THE DRAWINGS

Further advantages become apparent from the following description of the drawings. Exemplary embodiments of the disclosure are illustrated in the drawings. The drawings, the description, and the claims contain numerous features in combination. A person skilled in the art will expediently also consider the features individually and aggregate them to form meaningful further combinations. In the drawings:

The same components are provided with the same reference numerals in the following drawings.

DETAILED DESCRIPTION

Figure 1:
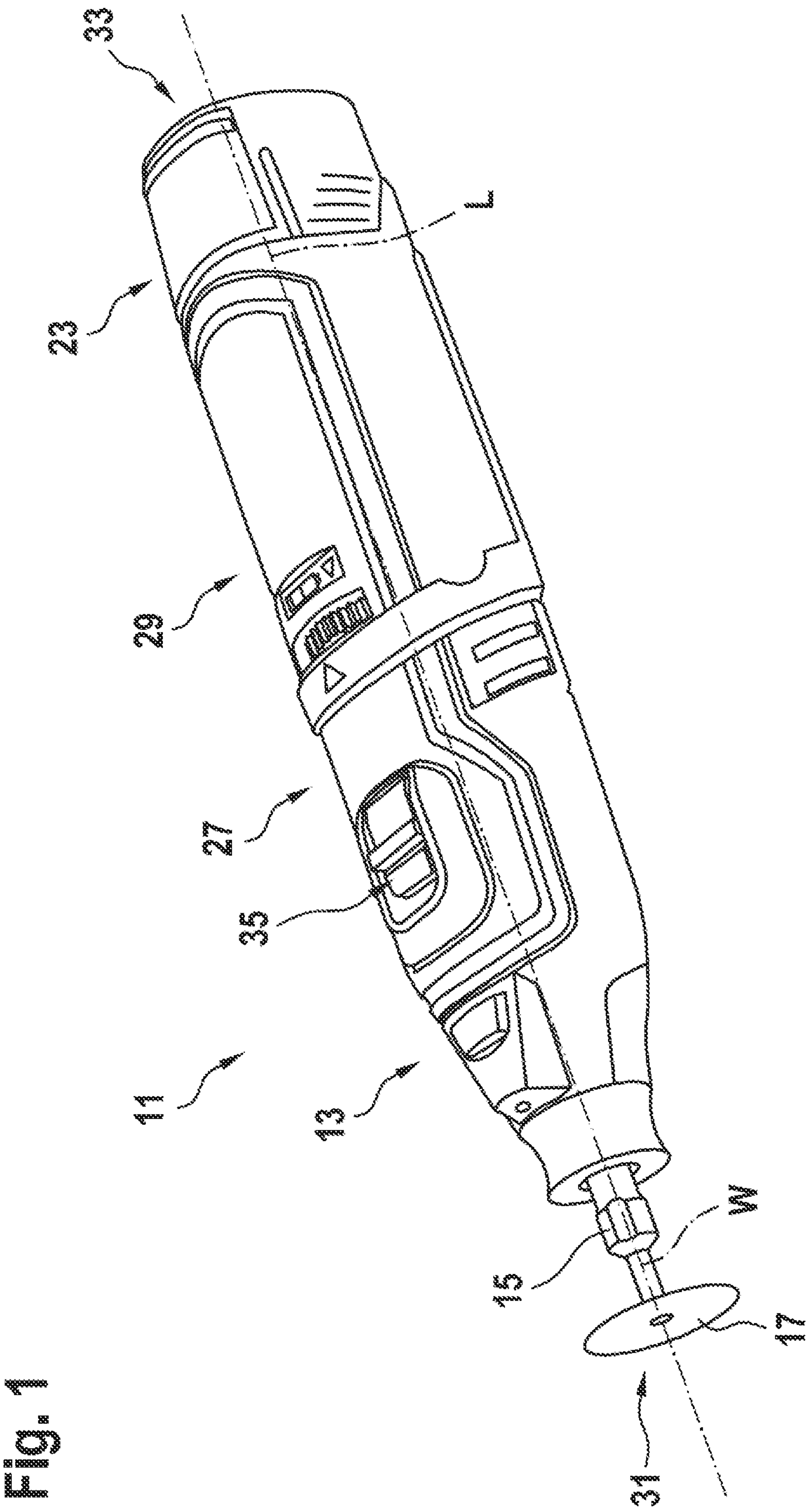
FIG. 1 shows a perspective view of a handheld power tool from the prior art.

The drawings show a rotary-drive handheld power tool 11, which is designed as a rotary power tool, with a locking device 13. The locking device 13 has a shaft 15 for driving an accessory device 17, which can be connected to the handheld power tool 11, a locking element 19 for locking the shaft 15, and an activating element 21 for activating the locking device 13.

The handheld power tool 11 is configured as a multi-function power tool and can be connected to a plurality of accessory devices 17 or attachments in order to provide various functions such as, for example, cutting, grinding, milling, polishing, and drilling. The handheld power tool 11 can be operated by means of a battery unit 23 and for this purpose has a rechargeable battery unit 23, consisting of a plurality of battery cells, which forms an energy source in order to temporarily store electrical energy and to supply electrical energy to the handheld power tool 11.

The handheld power tool 11 has a drive unit 25, in the form of an electric motor, which is provided to drive the accessory device 17 directly. The drive unit 25 can be commutated electronically (EC drive) or mechanically (brushed drive). The drive unit 25 is provided to drive the shaft 15, which in turn drives the accessory device 17. It should be understood that other types of drive units 25 which would be viewed as appropriate by a person skilled in the art can also be considered.

The handheld power tool 11 has a motor housing 27 with a handle region 29 which is provided to be gripped by an operator of the handheld power tool 11 and be held with one hand. The motor housing 27 has an elongated design and extends essentially along a longitudinal axis L which coincides with the shaft axis W. The shaft 15 is designed as a driving shaft 15. Alternatively or additionally, the shaft 15 can be designed as a driven shaft 15. The handheld power tool 11, in particular the motor housing 27, extends from a first end 31, 33 as far as a second end 33 remote from the first end 31. The accessory device 17 is arranged at the first end 31. The second end 33 can have a battery interface which is provided to receive the battery unit 23. The battery unit 23 is arranged at the second end 33 and/or can be connected to the second end 33 or the battery interface.

The battery unit 23 is arranged in the handle housing and surrounded by the latter. The battery unit 23 is arranged on or in the handle housing in such a way that the battery unit 23 can be connected detachably to the motor housing 27. The motor housing 27 has a battery interface which can be accessed from outside or without disassembling the motor housing 27 in order to couple, and in particular electrically connect, the battery unit 23 to the battery interface.

The battery unit 23 extends along an axis which coincides with a longitudinal axis L of the motor housing 27 or the handle region 29. The battery unit 23 extends along an axis which essentially coincides with, or is arranged at least essentially parallel to, a longitudinal axis L of the shaft 15 or a drive unit 25 of the handheld power tool 11.

The handheld power tool 11 has an on/off switch element 35, in the form of a button, which is arranged directly adjacent to the activating element 21. The on/off switch element 35 is mounted so that it can move in a radial direction with respect to the shaft 15 in order to switch the drive unit 25 on and off. The on/off switch element 35 is arranged on a side of the activating element 21 remote from the accessory device 17.

The locking element 19 is provided to lock the shaft 15 indirectly or directly. The locking element 19 has an essentially elongated design and extends perpendicular to the shaft 15. The locking element 19 is provided to be connected positively to the shaft 15 in order to restrict or prevent movement of the shaft 15 by the locking element 19 engaging at least partially in the shaft 15. The locking element 19 is designed as a bolt-shaped locking pin.

The activating element 21 is mounted so that it can move in an axial direction along a shaft axis W of the shaft W. The activating element 21 is provided to activate the locking element 19. The activating element 21 is designed as a slide switch. The activating element 21 is mounted so that it can move in an axial direction relative to the shaft axis W of the shaft 15. The activating element 21 is coupled to the locking element 19. The activating element 21 and the locking element 19 are mounted so that they can move in different directions of movement. The activating element 21 is mounted so that it can move along the longitudinal axis L or along the shaft axis W (activating direction 37). The locking element 19 is mounted so that it can move perpendicular to the longitudinal axis L or the shaft axis W (locking direction 39). The activating element 21 is mounted so that it can move in translation and essentially parallel to the shaft axis W of the shaft 15.

The activating element 21 is arranged on or in the region of a first end 31. The activating element 21 is arranged on a handle region 29 of the motor housing 27 and is preferably gripped by an operator's fingers.

Figure 2:
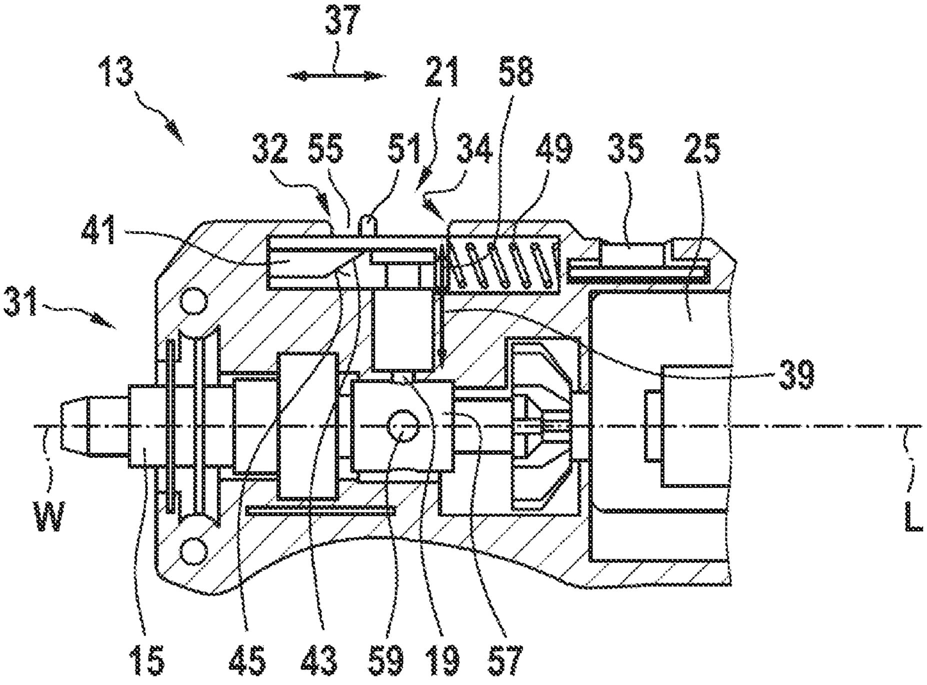
FIG. 2 shows a section through a handheld power tool according to the disclosure in a release state.
Figure 3:
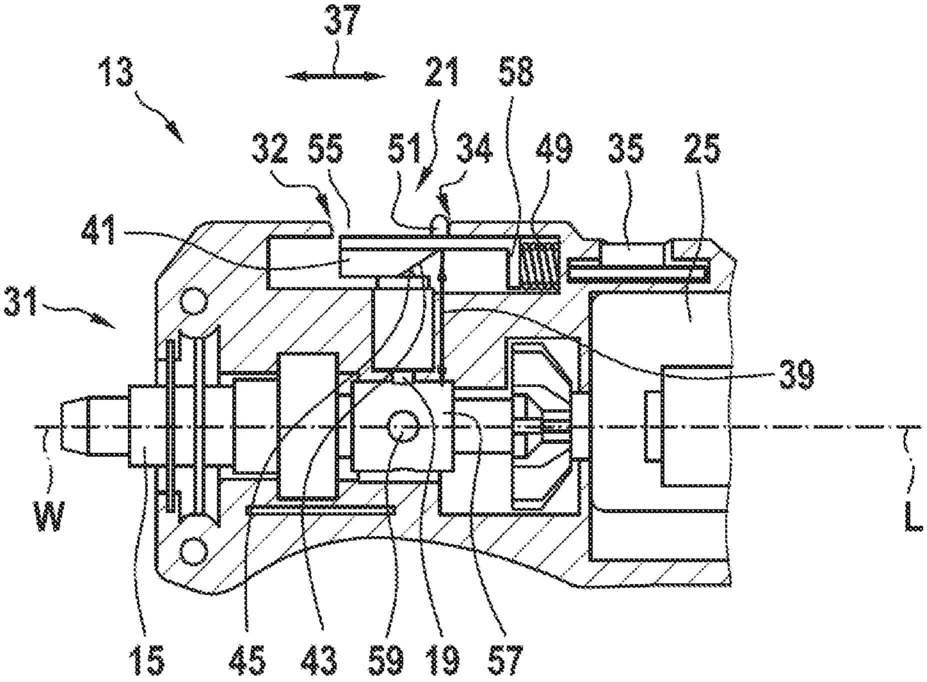
FIG. 3 shows a section through a handheld power tool according to the disclosure in a locking state.

The locking device 13 has a locking state (FIG. 3) and a release state (FIG. 2). The activating element 21 is arranged closer to the accessory device 17 in a release state (FIG. 2) than in a locking state (FIG. 3).

The accessory device 17 is arranged at the first end 31. The battery unit 23 is arranged or can be connected at the second end 33.

When it moves toward the accessory device 17, the activating element 21 can be moved into a release state, and when it moves away from the accessory device 17, it can be moved into a locking state. The activating element 21 is arranged at an end 31, facing the accessory device 17, of the handheld power tool 11, in particular of the motor housing 27.

The locking device 13 is accordingly designed in such a way that the activating element 21 is arranged at a bottom dead center 32 or facing the first end 31 in a release state, and that the activating element 21 is arranged at a top dead center 34 or facing the second end 33 in a locking state.

The locking device 13 has an actuating element 41 which is provided to move the locking element 19, depending on a movement of the activating element 21, perpendicular to the movement direction of the activating element 21. The actuating element 41 is arranged on the activating element 21 or contacts the latter and is designed integrally with it. The actuating element 41 is arranged at a distance from and not contacting the locking element 19 in a release state. The actuating element 41 is designed as an actuating protrusion and extends in a radial direction with respect to the shaft 15. The actuating protrusion has a slope 43 which is provided to transfer the locking element 19 from a release state into a locking state, and vice versa. The slope 43 takes the form of an inclination which extends transversely to the direction of movement of the activating element 21. The actuating protrusion, in particular the slope 43, has an inclined surface 45 which serves as a sliding surface for the locking element 19 in order to shift the locking element 19 from the release state into the locking state. The inclined surface 45 has a flat design. The inclined surface 45 has a surface normal which points toward the locking element 19 and intersects the latter.

The locking device 13 has a spring element 49 which is provided to reset the activating element 21 and/or the locking element 19 from a locking state into a release state. The spring element 49 is designed as a compression spring element. The spring element 49 is designed as a helical spring. The spring element 49 is provided to absorb kinetic energy when the activating element 21 and/or the locking element 19 is/are moved from the release state into the locking state. The spring element 49 is provided to deliver kinetic energy when the activating element 21 and/or the locking element 19 is/are moved from the locking state into the release state. It should be understood that a person skilled in the art can also use other spring elements 49 which would be viewed as appropriate by a person skilled in the art.

The spring element 49 is arranged on a shoulder 58 of the activating element 21 or is connected thereto such that the activating element 21 returns to its original position (release state) when there is no force exerted on the activating element 21 by the operator or the force on the operating element 21 is removed.

The locking device 13 has an activating lever 51 which is provided to restrict movement of the activating element 21. The activating lever 51 is arranged on a side of the activating element 21 remote from the actuating element 41 and extends in a radial direction with respect to the shaft 15. The activating lever 51 is provided to be guided in a recess 55 of the motor housing 27 of the handheld power tool 11. The activating lever 51 is designed integrally with the activating element 21 and protrudes relative to the motor housing 27 in a radial direction. The activating lever 51 is arranged on a first end 32 of the recess 55 in a release state. The activating lever 51 is arranged on or bears against a second end 34 of the recess 55 in a locking state. The first end 32 of the recess 55 is arranged closer to the accessory device 17 than the second end 34 of the recess 55. The activating lever 51 forms a holding shoulder which serves as a gripping region when working with the handheld power tool 11 without shifting the locking device 13 into the locking state.

The locking device 13 has a locking sleeve 57 which is arranged non-rotatably on the shaft 15 and delimits a radial extent of the shaft 15 and completely surrounds or encases it. The locking sleeve 57 is provided to connect the shaft 15 non-rotatably and positively to the locking element 19. The locking sleeve 57 has a plurality of locking recesses 59, arranged in a circumferential direction around the shaft 15, which are provided to receive the locking element 19 in a locking state and to secure the shaft 15 against twisting. The locking recesses 59 are delimited by the locking sleeve 57 and, in a radial direction with respect to the shaft 15, by the shaft 15.

What is claimed is:

1. A locking device for a rotary-drive handheld power tool with a shaft configured to drive an accessory device configured to be connected to the handheld power tool, comprising:

a locking element configured to lock the shaft so that the accessory device cannot be driven by the shaft; and an activating element configured to move the locking element, wherein the activating element is mounted such that it is movable along a shaft axis of the shaft, wherein:

the activating element is configured to be moved into a release state when a first force is applied in a direction toward the accessory device such that the activating element moves toward the accessory device when the accessory device is connected to the handheld power tool; and the activating element is configured to be moved into a locking state when the first force is removed such that the activating element moves away from the accessory when the accessory device is connected to the handheld power tool.

2. The locking device according to claim 1, wherein the activating element is mounted so that it can move in a straight line.

3. The locking device according to claim 1, wherein the activating element is mounted such that it is movable parallel to the shaft.

4. The locking device according to claim 1, wherein:

the locking device has a locking state and a release state; and the activating element is arranged closer to the accessory device in the release state than in the locking state when the accessory device is connected to the handheld power tool.

5. The locking device according to claim 1, further comprising:

an actuating element configured to move the locking element relative to the shaft in a different movement direction than a movement direction of the activating element.

6. The locking device according to claim 1, further comprising:

a spring element configured to reset the locking device by resetting at least one of the activating element and the locking element.

7. The locking device according to claim 1, further comprising:

an activating lever configured to restrict movement of the actuating element.

8. The locking device according to claim 1, further comprising:

a locking sleeve arranged on the shaft.

9. The locking device according to claim 8, wherein the locking sleeve has a locking recess configured to receive the locking element a locking state, and to secure the shaft against twisting.

10. A handheld power tool, comprising:

a locking device according to claim 1; and a drive unit configured to drive the accessory device.

11. The locking device of claim 1, wherein:

the activating element is positioned such that a user can hold the handheld power tool and activate the activating element with a single hand.

12. The handheld power tool of claim 10, wherein:

the activating element is positioned such that a user can hold the handheld power tool and activate the activating element with a single hand.

13. The handheld power tool of claim 10, wherein the locking element is configured to lock the shaft against rotation by a drive unit of the handheld power tool.

14. The handheld power tool of claim 10, wherein:

the handheld power tool has a housing;

a drive unit is positioned with in the housing; and the activating element is positioned at least partially within the housing.

15. The locking device according to claim 8, wherein the locking sleeve is arranged in fixed relation to the shaft.

16. A handheld power tool, comprising:

a drive unit configured to rotate a shaft, the shaft defining a shaft axis; and a locking device including a locking element extending perpendicularly to the shaft and configured to lock the shaft so that the shaft cannot be rotated by the drive unit, and an activating element configured to move along the shaft axis to move the locking element to lock the shaft so that the shaft cannot be rotated by the drive unit, wherein:

the shaft includes a first end portion configured to couple with an accessory;

the activating element is configured to be moved from a locked state, whereat the shaft is locked so that the shaft cannot be rotated by the drive unit, along the shaft axis into a release state whereat the shaft can be rotated by the drive unit, when a first force is applied in a direction toward the first end portion, and is further configured to be moved from the release state into the locking state when the first force is removed.

* * * * *